United States Patent Office 2,957,200
Patented Oct. 25, 1960

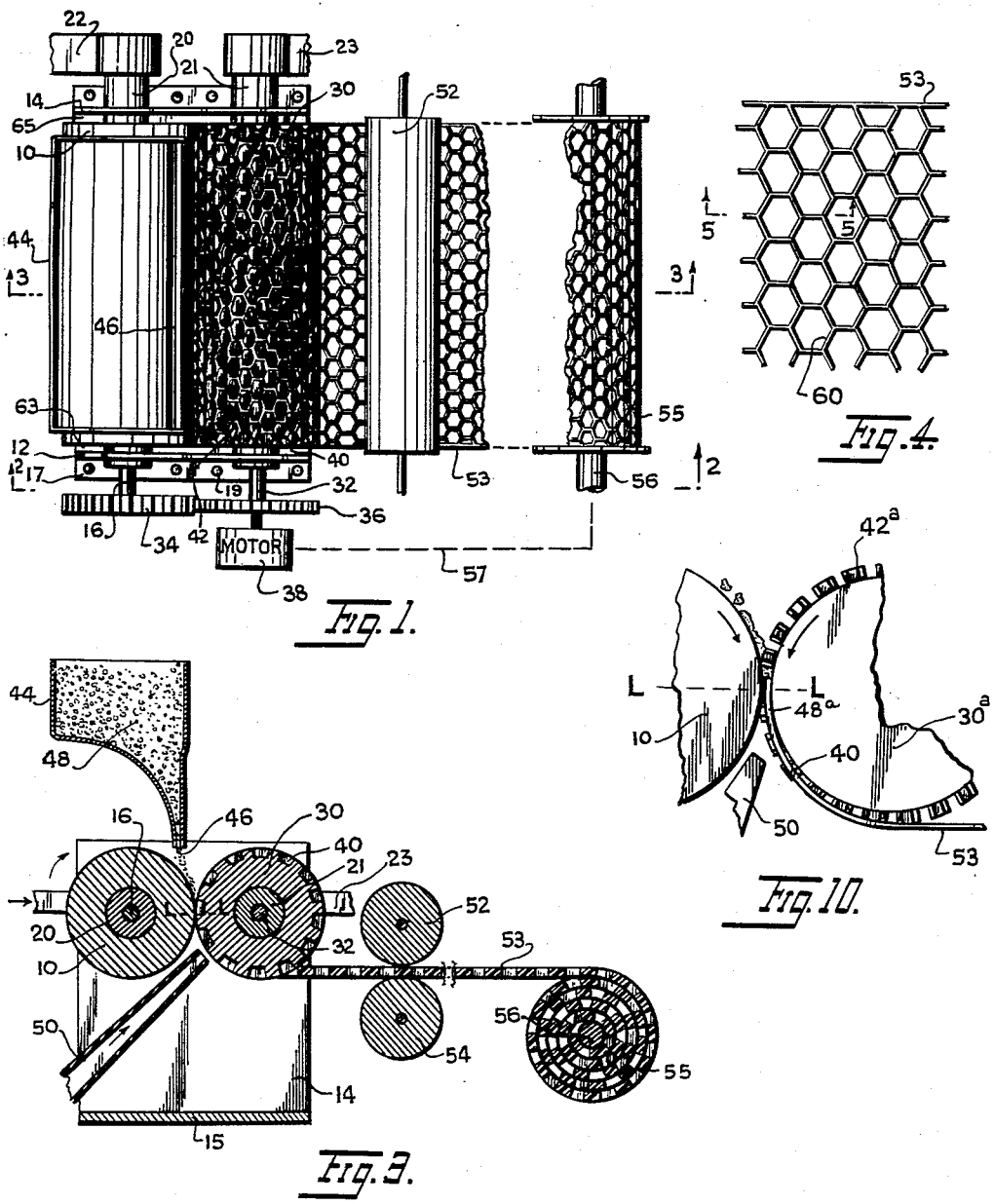

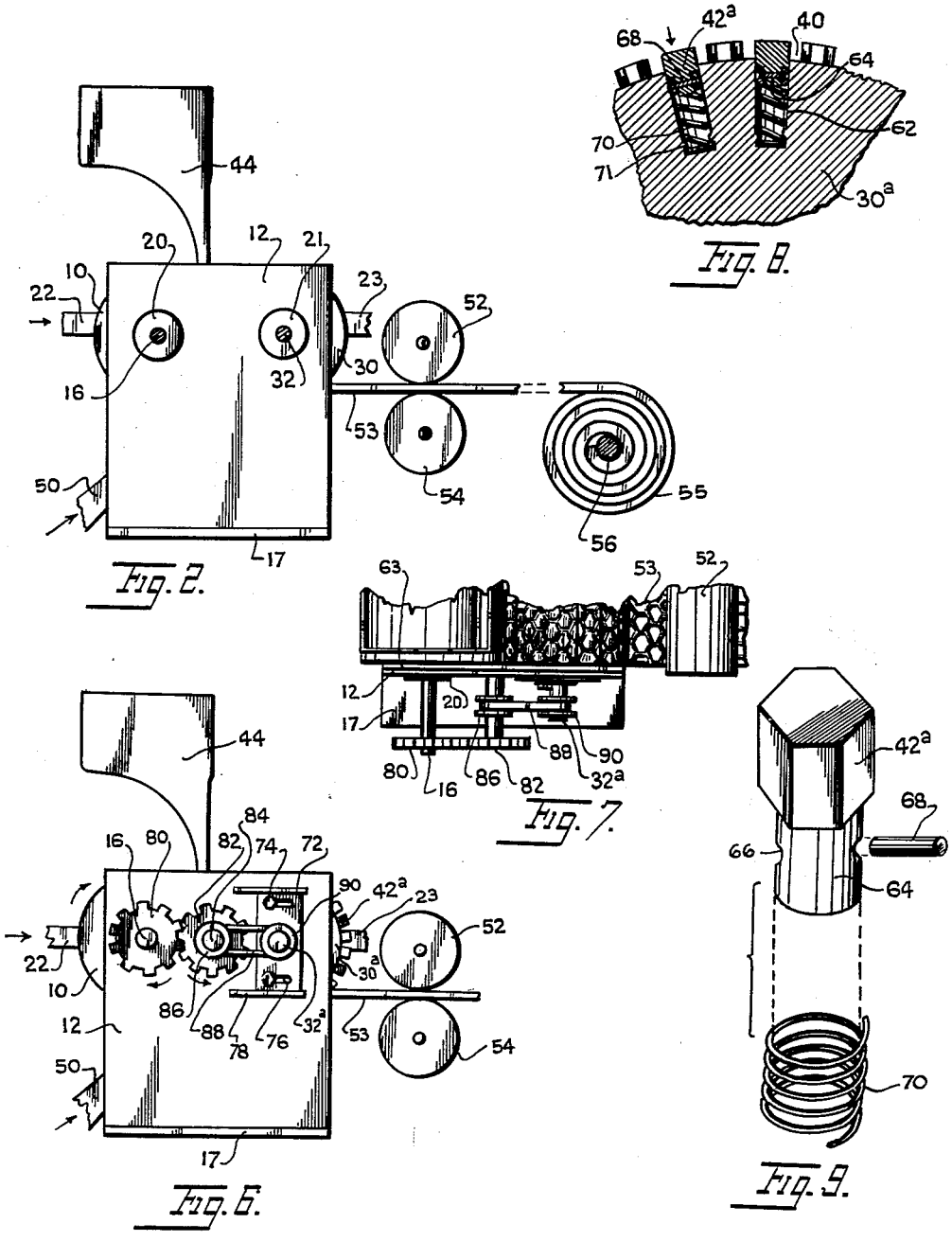

2,957,200

METHOD AND APPARATUS FOR MANUFACTURING SYNTHETIC NETS

Herman Pufahl, 1568 Miriam Court, Elmont, N.Y., and Joseph Pufahl, 81 Gerard Ave., New Hyde Park, N.Y.

Filed Nov. 13, 1958, Ser. No. 773,609

5 Claims. (Cl. 18—9)

This invention relates to the art of manufacturing reticulated articles and particularly concerns a method and apparatus for manufacturing a plastic net or lace web.

According to the invention there is provided a pair of rollers, one of which rollers has a smooth surface and the other of which is formed with a hexagonal embossed pattern. The two rollers are disposed to roll against each other along a line of abutment. A hopper feeds thermoplastic material in granular or pellet form to the abutting rollers. The smooth roller is heated just below the melting point of the plastic material to soften it. The other embossed roller is heated to the melting point so that the plastic material flows at the line of abutment of the rollers to fill the grooves around the embossed portions of the roller. A stream of cold air is directed at the embossed roller just beyond the line of abutment so that the molten plastic is cooled and set to form a reticulated sheet. The sheet is stripped off the embossed roller as an elastic net lace. The invention makes it possible to form a plastic net lace of the character described without the necessity of punching, stretching, cold drawing or other conventional methods which are complex, costly, and wasteful of material, and which result in sheets having internal strains and unstable structures.

In another form of the invention the embossed roller is provided with spring loaded embossing blocks constructed like pistons so that various thicknesses of reticulated sheets can be formed with a single pair of rollers.

It is therefore a principal object to provide a method of forming net lace by casting thermoplastic material on an embossed roller.

It is a further object to provide an apparatus for forming a net lace from thermoplastic material, the apparatus including a smooth roller and an embossed roller, the rollers being differentially heated.

It is a further object to provide an apparatus of the character described wherein one of the rollers is embossed with a hexagonal pattern.

It is another object to provide two differentially heated, coacting rollers, one roller being embossed for forming a reticulated lace net of plastic material, the roller being adjustably positionable with respect to the other coacting roller and provided with spring-mounted embossing elements.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of an apparatus embodying the invention, parts being shown broken away.

Figs. 2 and 3 are elevational sectional views taken on lines 2—2 and 3—3, respectively, of Fig. 1.

Fig. 4 is a plan view on an enlarged scale of a portion of a lace sheet or web formed in accordance with the invention.

Fig. 5 is a sectional view on a further enlarged scale taken on line 5—5 of Fig. 4.

Fig. 6 is an elevational view of an apparatus embodying another form of the invention.

Fig. 7 is a fragmentary plan view of the apparatus of Fig. 6.

Fig. 8 is a sectional view on an enlarged scale of a portion of the embossed roller employed in the apparatus of Fig. 6.

Fig. 9 is an exploded perspective view of an embossing element and anchoring means employed in the roller of Fig. 8.

Fig. 10 is a fragmentary elevational view on an enlarged scale of portions of the rollers employed in the apparatus of Fig. 6.

Referring to Figs. 1–3, there is shown a cylindrical roller 10 journaled for rotation in a pair of vertical frame members 12, 14. The roller has a shaft 16 and concentrically disposed around the shaft and within the roller is a metal sleeve 20. This sleeve extends axially outwardly to connect with a conduit 22 providing an external source of heat for heating the roller 10. This source of heat may be a steam jet, hot air, heated oil or gas or the like delivered to conduit 22. The heat source may be regulated by a thermostat or other conventional means so that the roller 10 is heated slightly below the melting point of thermoplastic material to be deposited upon it.

Juxtaposed to roller 10 is another roller 30. This latter roller is disposed with its axis parallel to roller 10 to rotate in contact therewith along a longitudinal peripheral line of abutment as indicated by L—L in Fig. 3. Roller 30 rotates on a shaft 32 which is disposed within a sleeve 21 connected to another conduit 23 outside of the roller. Conduit 23 provides another source of heat to heat roller 30 to the melting point of the thermoplastic material at the line of abutment of the rollers. Shafts 16 and 32 rotate in frame members 12 and 14 joined by base plate 15. This plate has outer flanges 17 with holes 19 whereby the frame can be secured to a floor or other support. Shafts 16 and 32 carry meshing gears 34, 36, respectively. Shaft 32 and roller 30 are driven rotationally by motor 38.

The cylindrical surface of roller 30 is embossed with a network of interconnected grooves 40 defining therebetween hexagonal bosses or blocks 42. The rollers rotate in abutment so that the tops of the bosses 42 rotate against the smooth convex surface of roller 10.

Mounted above the rollers is a hopper 44 having a slit 46 through which can be discharged thermoplastic material 48 in granular or pellet form. The material is omitted from the hopper in Fig. 1 to show the curved bottom of the hopper with slit 46 therein. This slit is located just above roller 10 so that it discharges the granular material immediately in advance of the line of abutment L—L of the rollers 10 and 30, as best shown in Fig. 3.

A duct 50 is located below roller 30 just beyond the line of abutment of the rollers. This duct provides a stream of cooling air which is directed on roller 30 to cool and harden the thermoplastic material. Heat source 22 maintains the roller 10 about 5° F. below the melting point of the thermoplastic material so that the material is softened but not melted by the heated roller. Roller 30, which is heated to the melting point by heater 23, melts the plastic material.

A pair of idler rollers 52 and 54 are disposed in abutment a short distance from the rollers 10, 30 for transferring the reticulated web 53 formed on the latter rollers to a take-up reel or roller 55. The reel 55 has a shaft 56 which may be driven by motor 38 through a suitable gear means indicated diagrammatically by dotted line 57 in Fig. 1.

A pair of plates 63, 65 are disposed on the inner sides of frame plates 12 and 14. These inner plates are preferably formed of a resilient heat resistant material such as a silicone plastic. These plates form lateral enclosures for the granular material which is deposited on roller 10 from the hopper.

In operation of the apparatus, the thermoplastic material will pour from the hopper in an elongated stream extending longitudinally parallel to the axes of the rollers 10 and 30. The granulated material will impinge on the heated roller and will become softened and moldable. The softened material will be carried by the rotating roller to the line of abutment L—L with the embossed roller 30 where it will melt and flow into the network of grooves 40. The stream of cool air emitted by duct 50 cools roller 30 so that the material distributed in the grooves 40 hardens and can be stripped off as a web by the idler rollers 52, 54 to be taken up on the take-up reel 55.

In Figs. 4 and 5 is shown the form of the elastic web 53 with hexagonal openings 60 as formed by the apparatus of Figs. 1–3.

In Figs. 6–10 is shown another form of the invention in which roller 30ª has a plurality of hexagonal bores 62 in which are slidable the hexagonal blocks 42ª. These blocks are each formed with a stem 64 having a transverse passage 66 into which can be inserted a pin 68. This pin is intended to engage in the upper turn of a coil spring 70. The coil spring can be seated in a bore 62 which has inwardly protruding knobs 71 for engaging the lower turn of the spring. Thus, each block 42ª is retractable in the bore 62 in which it is mounted.

Roller 30ª is carried on shaft 32ª which is journaled in rectangular bearing plates 72 carried on frame plates 12 and 14. Bolts 74 pass through slots 76 in the plates 72 so that the plates can be laterally adjusted on the bolts. Guide bars 78 disposed above and below each plate 72 insure the vertical positioning of the bearing plate being effectively retained. By adjusting the positions of plates 72, the spacing of roller 30ª from roller 10 can be adjusted. Shaft 16 of roller 10 carries a gear 80 which meshes with a gear 82 carried on a stub shaft 84 journaled in frame plate 12. Shaft 84 also carries a pulley 86 over which is engaged an elastic belt 88. Belt 88 is also engaged on a pulley 90 carried on shaft 32ª. Shaft 32ª is rotated by a motor such as indicated by motor 38 shown in Fig. 1.

In operation of the apparatus of Figs. 6–10, the thickness of the web 53 will be determined by the spacing of the rollers. In all positions of roller 30ª, the embossing blocks 42ª will abut the roller 10 because of the outward extension of the blocks by springs 70. In forming the web, the resiliently mounted blocks perform an additional function best illustrated in Fig. 10. It will be noted that the blocks 42ª are pressed inwardly as they pass the line of abutment L—L. At this line the softened material 48ª is melted by roller 30ª and flows into the grooves 40 between the blocks. As the roller 30ª moves away from line L—L the material is hardened in the cold air stream emitted by duct 50. At the same time the inwardly pressed blocks 42ª begin to move outwardly from the surface of the roller carrying the web 53 with them at their outer ends. This prevents the web from sticking to the roller when it is finally separated therefrom by the idler rollers 52, 54. As a result, the web is easily strippable from the blocks and passes easily, intact and unwarped to the take-up roller.

The apparatus of Figs. 6–10 has the advantage that various thicknesses of perforated or reticulated web can be made with the single embossed roller. Elastic belt 88 compensates for any change in position of shaft 32ª and drives pulley 86 and shaft 84 so that gear 80, shaft 16 and roller 10 are driven simultaneously.

Blocks 42ª are removable by pulling them outwardly and extracting pins 68. The blocks can be replaced by blocks of different length. It is not necessary that the bores and blocks be hexagonal. If desired, they can be rectangular, circular, triangular or have other geometrical shapes. The embossed elements 42 in Figs. 1–3 can also have different geometrical shapes.

In general, the range of adjustment of the spacing of rollers 10 and 30ª will be limited to a fraction of an inch. The maximum spacing of the rollers will in all cases be less than the maximum distance that the block 42ª projects from the surface of roller 32ª.

It is to be understood that by means of this method, any size or shape of elastic or non elastic lace webs may be produced.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. An apparatus for forming an elastic plastic lace net, comprising a pair of vertically disposed frame plates, a pair of rollers rotatably carried by said plates and contacting each other along a line of abutment, said plates providing lateral enclosures for said rollers above said line of abutment, a hopper disposed to deposit granular thermoplastic material upon one of said rollers within said enclosures, means for heating said one roller to a temperature just below the melting point of said material so that said material is softened, means for heating said other roller to the melting point of said material to mold the softened material, said other roller having an embossed pattern thereon, means for cooling the molded material so that the molded material is set, and means for stripping the set material from said other roller in the form of a net having said pattern, said embossed pattern being formed by a plurality of blocks retractably mounted in said other roller and projecting radially outward, said blocks being biased outwardly by spring means.

2. An apparatus for forming an elastic plastic lace net, comprising a pair of vertically disposed frame plates, a pair of rollers rotatably carried by said plates and contacting each other along a line of abutment, said plates providing lateral enclosures for said rollers above said line of abutment, a hopper disposed to deposit granular thermoplastic material upon one of said rollers within said enclosures, means for heating said one roller to a temperature just below the melting point of said material so that said material is softened, means for heating said other roller to the melting point of said material to mold the softened material, said other roller having an embossed pattern thereon, means for cooling the molded material so that the molded material is set, and means for stripping the set material from said other roller in the form of a net having said pattern, said embossed pattern being formed by a plurality of blocks retractably mounted in said other roller and projecting radially outward, said blocks being biased outwardly by springs means, said rollers being coupled by elastic drive means, and means for adjustably spacing said rollers, the thickness of said net being controllable by the spacing of the rollers.

3. An apparatus for forming an elastic plastic lace net, comprising a pair of vertically disposed frame plates, a pair of rollers rotatably carried by said plates and contacting each other along a line of abutment, said plates providing lateral enclosures for said rollers above said line of abutment, a hopper disposed to deposit granular thermoplastic material upon one of said rollers within said enclosures, means for heating said one roller to a temperature just below the melting point of said material so that said material is softened, means for heating said other roller to the melting point of said material to mold the softened material, said other roller having an embossed pattern thereon, means for cooling the molded material so that the molded material is set, and means for stripping the set material from said other roller in the form of a net having said pattern, said embossed pattern being formed by a plurality of blocks retractably mounted in said other roller and projecting radially outward, said blocks being biased outwardly by spring means, each of said blocks being hexagonal in cross section.

4. An apparatus for forming an elastic plastic lace net, comprising a pair of vertically disposed frame plates, a pair of rollers rotatably carried by said plates and contacting each other along a line of abutment, said plates providing lateral enclosures for said rollers above said line of abutment, a hopper disposed to deposit granular thermoplastic material upon one of said rollers within said enclosures, means for heating said one roller to a temperature just below the melting point of said material so that said material is softened, means for heating said other roller to the melting point of said material to mold the softened material, said other roller having an embossed pattern thereon, means for cooling the molded material so that the molded material is set, and means for stripping the set material from said other roller in the form of a net having said pattern, said embossed pattern being formed by a plurality of outwardly projecting blocks removably and retractably mounted in said other roller and biased outwardly by spring means, and means for adjustably spacing said rollers for controlling the thickness of the net formed thereon.

5. An apparatus for forming an elastic plastic lace net, comprising a pair of vertically disposed frame plates, a pair of rollers rotatably carried by said plates and contacting each other along a line of abutment, said plates providing lateral enclosures for said rollers above said line of abutment, a hopper disposed to deposit granular thermoplastic material upon one of said rollers within said enclosures, means for heating said one roller to a temperature just below the melting point of said material so that said material is softened, means for heating said other roller to the melting point of said material to mold the softened material, said other roller having an embossed pattern thereon, means for cooling the molded material so that the molded material is set, and means for stripping the set material from said other roller in the form of a net having said pattern, said embossed pattern being formed by a plurality of outwardly projecting blocks removably and retractably mounted in said other roller and biased outwardly by spring means, and means for adjustably spacing said rollers for controlling the thickness of the net formed thereon, the spacing of said rollers being less than the distance each of said blocks projects from said other roller, so that said blocks are fully extended in advance of and beyond said line of abutment, and are at least partially retracted at said line of abutment.

References Cited in the file of this patent

UNITED STATES PATENTS

| | | |
|---|---|---|
| 934,214 | Ratignier et al. | Sept. 14, 1909 |
| 1,873,041 | Robinson | Aug. 23, 1932 |
| 2,218,227 | Winnek | Oct. 15, 1940 |
| 2,267,372 | Calkins et al. | Dec. 23, 1941 |
| 2,318,111 | Steinberger | May 4, 1943 |
| 2,442,598 | Harrison et al. | June 1, 1948 |
| 2,758,336 | Franssen | Aug. 14, 1956 |
| 2,776,451 | Chavannes | Jan. 8, 1957 |
| 2,801,439 | Meares | Aug. 6, 1957 |
| 2,811,750 | Cofek | Nov. 7, 1957 |

FOREIGN PATENTS

| | | |
|---|---|---|
| 134,532 | Australia | Oct. 6, 1949 |